UNITED STATES PATENT OFFICE.

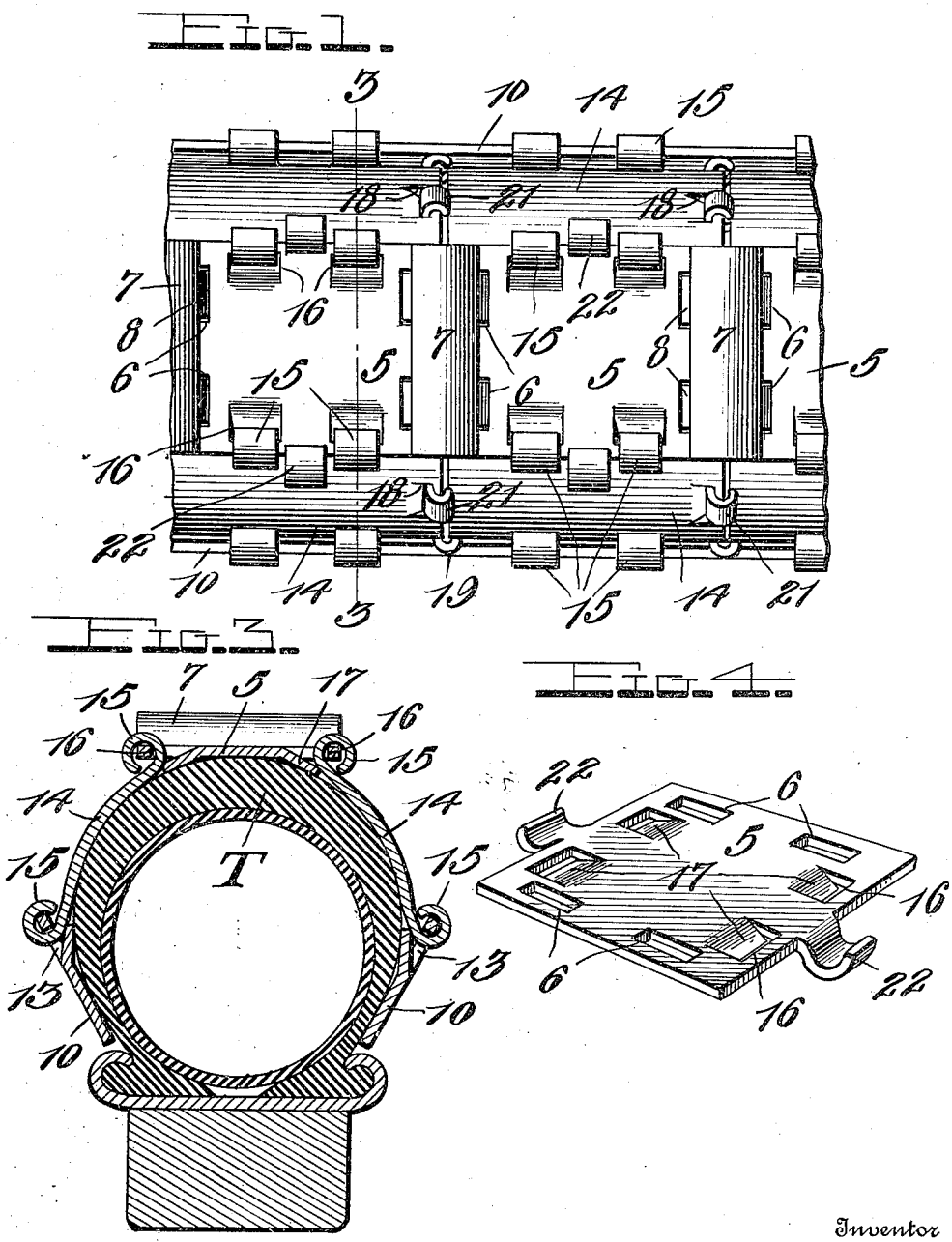

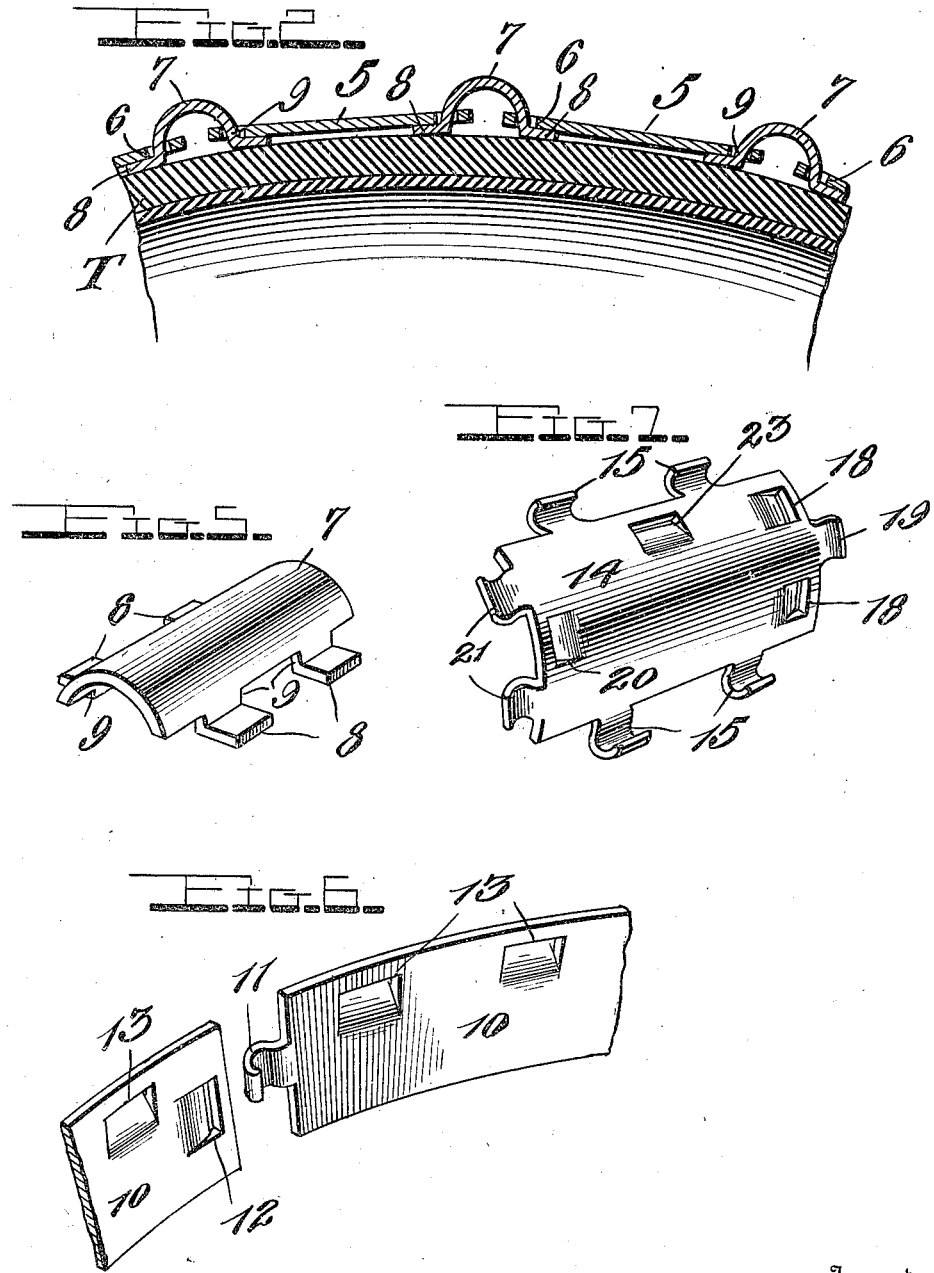

ANDREW M. BRUCE, OF FULTON, MISSOURI.

TIRE-ARMOR.

997,646.

Specification of Letters Patent.

Patented July 11, 1911.

Application filed February 16, 1911. Serial No. 608,887.

*To all whom it may concern:*

Be it known that I, ANDREW M. BRUCE, a citizen of the United States, residing at Fulton, in the county of Callaway and State of Missouri, have invented certain new and useful Improvements in Tire-Armors, of which the following is a specification, reference being had to the accompanying drawings.

This invention relates to tire armors and has particular relation to an armor for pneumatic tires of that character commonly used on motor vehicles, the object of the invention residing in the provision of such an armor which is of simple construction, will effectually eliminate external punctures of the tire and is capable of quick and easy repair.

Another object of the invention is to provide a tire armor consisting of a plurality of plates, and means formed on said plates whereby they may be interlocked to provide a complete metallic covering or casing for the tire, all crevices or openings between the plates being eliminated whereby the liability of tacks, glass or other penetrating objects entering the tire and piercing the inner tube, is obviated.

Still another object of the invention is to provide side rings or bands to be arranged upon opposite sides of the tire, flat metal plates arranged upon the tread portion of the tire, and means flexibly connecting the annular bands with said tread plates.

With the above and other objects in view, the invention consists of the novel features of construction, combination and arrangement of parts hereinafter fully described and claimed, and illustrated in the accompanying drawings, in which—

Figure 1 is a fragmentary top plan view of a motor vehicle wheel showing my improved armor applied to the tire thereof; Fig. 2 is a longitudinal section; Fig. 3 is a transverse section taken on the line 3—3 of Fig. 1; Fig. 4 is a detail perspective view of one of the tread plates; Fig. 5 is a similar view of one of the plates for connecting the tread plates longitudinally of the tire; Fig. 6 is a detail fragmentary perspective view of one of the annular bands showing the means for connecting the ends thereof; and Fig. 7 is a similar view of one of the side plates for connecting said band to the tread plates.

The present invention is devised with a view to providing a complete metallic covering or casing for the tires of motor vehicle wheels, said casing being of such construction as to secure complete flexibility of the armor so that it will readily conform to the transverse contour of the tire when the same is under compression, whereby danger of injury to the tire or breaking of the armor itself is avoided. With this end in view, I provide the flat rectangular tread plates 5 which are constructed of steel and are adapted to be arranged upon the tread portion of the outer casing of the tire T. Adjacent to the opposite edges, longitudinally of the tire, of the tread plate 5, the same is provided with spaced elongated slots 6 which are adapted to receive the spaced flanges or tongues 8 formed on the opposite longitudinal edges of the connecting member 7. These flanges 8 are adapted to be inserted through the slots 6 and extended beneath the tread plates 5 between the same and the periphery of the tire casing. The body of the connecting member 7 is of concavo-convex form, and the convex surface of said member extends above the plane of the surface of the tread plates 5 thereby preventing direct contact of the tread plates with the ground and thus practically eliminating all wear upon the same. It will be obvious that the connecting members 7 may be easily and quickly replaced by new ones when they become too far worn for effectual service. It will be observed that the flanges 8 on the edges of the members 7 are connected to the bodies of said members by the projections 9 which are of substantially the same depth as the slots 6, whereby when the flanges 8 are inserted through said slots, the slots are completely closed so that nails, glass or other material which would cut through the tire casing cannot enter the same.

Upon each side of the tire and adjacent to the rim of the wheel in which the edges of the tire casing are engaged, the annular bands or rings 10 are arranged. As shown in detail in Fig. 7, these annular bands are split and the opposed ends thereof are loosely connected by means of the tongue 11 which is formed on one end of said band and is adapted to be extended through the slot 12 in the other extremity of said band. The tongue is of concavo-convex form and is adapted to be bent for insertion through the slot 12 to form a hinge knuckle. Adjacent to the outer edge of the annular band, the same is further provided with a plurality of longitudinal slots 13 which are arranged in spaced relation. These slots 12 and 13 are formed by slitting or cutting the metal and bending or depressing the same out of the plane of the band. Thus it will be obvious that after the connection has been made between the ends of the band, the slot 12 is entirely closed.

The tread plates 5 are adapted to be flexibly connected to the annular bands 10 by means of the side plates 14. These side plates 14 are also of concavo-convex form and engage closely upon the periphery of the tire casing. The opposite longitudinal edges of the side plates are provided with the spaced tongues 15 which are curved outwardly and upwardly in a reverse direction to the body of the plate. One pair of the tongues 15 are adapted for insertion through adjacent slots 13 in the annular band 10, while the tongues upon the other edges of the side plate 14 are insertible through spaced slots 16 provided in the longitudinal edges of the tread plates. These slots 16 are formed in a similar manner to the slots 12 and 13, the edges of the depressed portions 17 of the tread plates engaging upon the periphery of the tire casing and with the surface of the tongues 15. It will therefore be seen that it is impossible for any foreign matter to enter through the slots 16 as they are completely and effectually closed. The longitudinal edges of the tread plates are also centrally provided with the curved tongues 22 for engagement in the slots 23 provided in the outer longitudinal edge portions of the plates 14. The opposed ends of the side plates 14 longitudinally of the tire are adapted to be connected in a similar manner, one end of each of said plates being provided with the spaced slots 18 and a single central tongue 19 formed thereon. The other end of the plate is provided with a single central slot 20 and the spaced tongues 21 which are curved oppositely to the single tongue 19. The tongue 19 on one plate is adapted for engagement in the central slot 20 on the opposed end of the next adjacent plate, while the tongues 21 on the latter plate engage in the slots 18 of the first named plate. These tongues are slightly bent for insertion through the various slots to provide a secure though flexible connection between the various elements of the armor.

From the foregoing it is believed that the construction and manner of assembling the various parts of my improved armor will be readily understood.

The device is comparatively simple, and as there is but little wear upon the tread portion of the armor, it will be obvious that the same is extremely durable and will require but slight and infrequent repair. As before stated, this repair will consist principally in the renewal of the connecting elements 7 by which practically all of the wear is sustained. The armor may also be easily and quickly applied to the tire without requiring any change in the construction of the same, or of the wheel upon which it is applied.

While I have shown and described the preferred construction and arrangement of the various parts, it will be obvious that the device is susceptible of considerable modification without departing from the essential feature or sacrificing any of the advantages thereof.

Having thus described the invention what is claimed is:—

1. A tire armor comprising flat rectangular tread plates having spaced slots in their opposed ends, transversely disposed concavo-convex wear plates having outwardly extending lugs formed on their opposite edges adjacent to each end of the plate, said lugs being adapted for insertion through the slots in said wear plates and engaging closely with the under surfaces of said plates and the periphery of the tire, annular bands arranged upon opposite sides of the tire, and concavo-convex plates pivotally connected to said bands and to the longitudinal edges of the tread plates.

2. A tire armor comprising flat rectangular tread plates arranged longitudinally upon the tire, transversely disposed concavo-convex wear plates connecting the opposed ends of the tread plates and overlapping the end edges thereof, said tread plates having angularly extending tongues struck therefrom adjacent their longitudinal edges to provide slots, annular bands arranged upon opposite sides of the tire, and concavo-convex side plates pivotally connected to said bands and having tongues formed on one of their longitudinal edges adapted to be received in the slots of said tread plates and bent over the edges of said plates to pivotally connect the side plates thereto, said tongues and the tongues of the tread plates entirely closing said slots, said latter tongues engaging closely upon the periphery of the tire.

In testimony whereof I hereunto affix my signature in the presence of two witnesses.

ANDREW M. BRUCE.

Witnesses:
N. B. McKEE,
MILLARD THURSTON.

---

Copies of this patent may be obtained for five cents each, by addressing the "Commissioner of Patents, Washington, D. C."